MOUNTING DEVICE FOR SEMICONDUCTORS

Filed Aug. 11, 1961 2 Sheets-Sheet 1

INVENTOR.
Robert A. Ruehle
BY
McCrew & Edwards
ATTORNEYS

Aug. 25, 1964 R. A. RUEHLE 3,146,384

MOUNTING DEVICE FOR SEMICONDUCTORS

Filed Aug. 11, 1961 2 Sheets-Sheet 2

INVENTOR.
Robert A. Ruehle
BY
McGrew & Edwards
ATTORNEYS

United States Patent Office 3,146,384 Patented Aug. 25, 1964

3,146,384
MOUNTING DEVICE FOR SEMICONDUCTORS
Robert A. Ruehle, 5594 E. Jefferson Ave., Denver 22, Colo.
Filed Aug. 11, 1961, Ser. No. 130,913
6 Claims. (Cl. 317—234)

This invention relates to mounting and heat dissipating devices for transistors, rectifiers and other semiconductor devices and the like.

It has been found desirable to mount electronic circuit components such as transistors and other semiconductor devices in a manner such that they do not vibrate and tend to loosen or break their lead wires; furthermore, for relatively high powered operation it becomes desirable to provide good heat flow paths to prevent damage to the semiconductor due to accumulation of heat and resulting high temperatures. Various arrangements and devices have been provided for this purpose and have met with some success; however, further simplification and ease of mounting are desirable. Accordingly, it is an object of this invention to provide an improved mounting device for transistors and other semiconductor devices.

It is another object of this invention to provide an improved heat dissipating device for semiconductor elements.

It is a further object of this invention to provide an improved semiconductor mounting device of simple and rugged construction.

Briefly, in carrying out the objects of this invention in one embodiment thereof, a mounting device is constructed which comprises a body of metal or other high conductivity material having a cavity for receiving a semiconductor element in spaced relation to the side walls of the cavity. A seat is provided for the element and a surrounding split sleeve of high conductivity material is provided to lie in the space between the element and the cavity walls, the thickness of the sleeve being less than that of the space. A split ring is provided, also of high conductivity material, and is arranged to be clamped against the sleeve by screws or other means and to force the sleeve into engagement with the semiconductor element and with the walls of the cavity to establish a good heat conducting path between the element and the mounting body. Heat dissipating fins on the outside wall of the body facilitate the removal of heat by convection to the surrounding air or other fluid. In another embodiment of the invention the split ring and split sleeve are made integral, the screws or other clamping devices acting to secure good heat conducting engagement in a manner similar to that of the first embodiment.

The features of novelty which characterize this invention are pointed out with particularity in the claims annexed to and forming a part of this specification. The invention itself, however, both as to its organization and method of operation will best be understood on reference to the following description taken in connection with the accompanying drawings, in which:

Figures 1, 2:
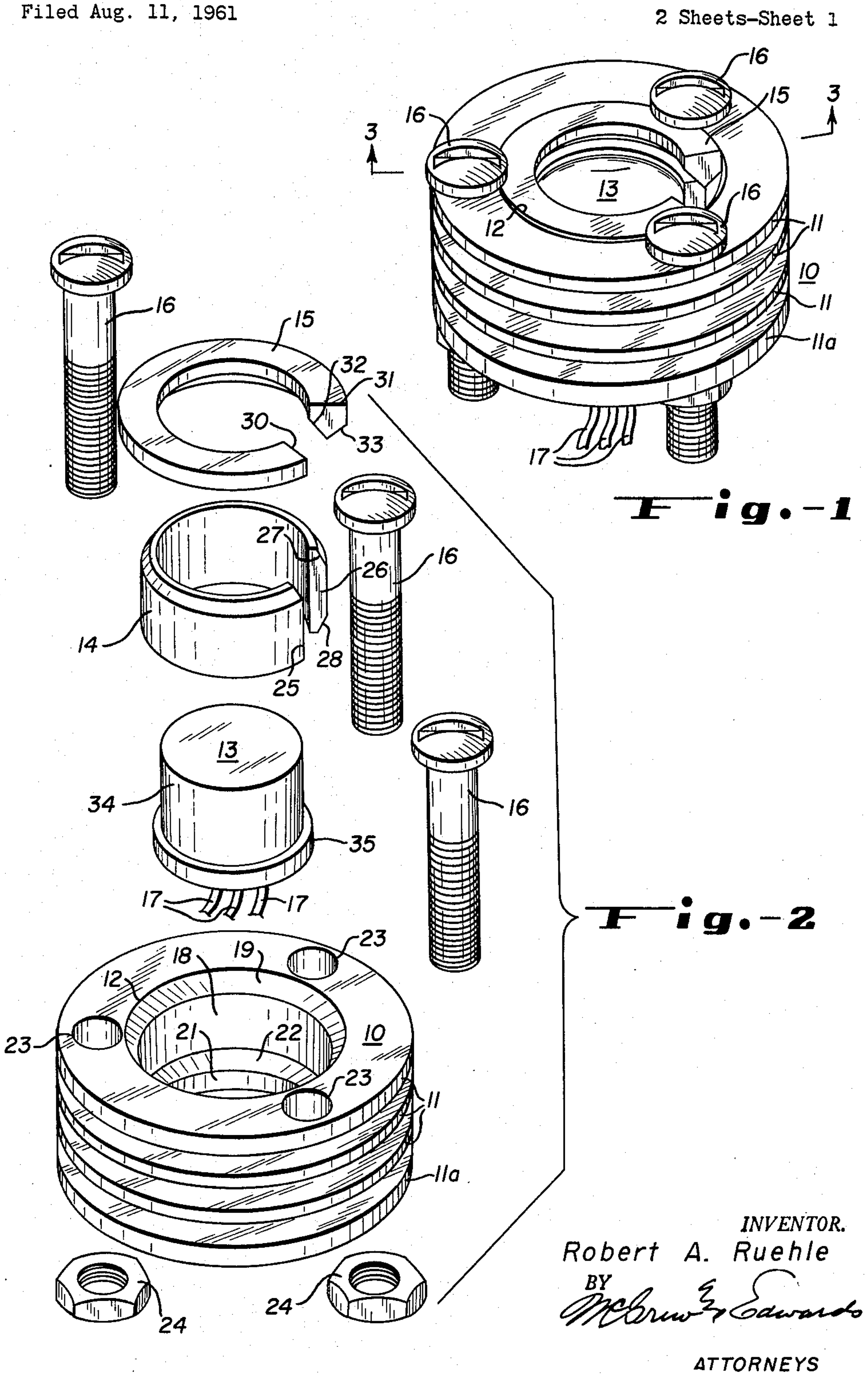
FIG. 1 is a perspective view of a mounting device embodying the invention.
FIG. 2 is an exploded perspective view of the mounting device of FIG. 1.

Referring now to the drawings, the mounting device as illustrated in FIG. 1 comprises a generally cylindrical body 10 having a plurality of heat dissipating fins 11 and a base fin 12 somewhat heavier than the fin 11. Within a cylindrical opening 12 within the body 10 there is mounted a semiconductor device such as a transistor 13, and this device is held securely in position by a split sleeve 14 cooperating with a split ring 15 which is secured against the base by a suitable clamping means such as a plurality of bolts 16. The electrical leads for the transistor extend out the bottom of the mounting as indicated at 17.

The details of construction are more clearly shown in the exploded view FIG. 2 wherein the shape of the cavity 12 within the body 10 may be seen to include a generally cylindrical portion 18, an upper beveled or sloping wall 19, a lower cylindrical wall 21 of smaller diameter than the cylindrical portion 18, and connected to the cylindrical portion by a sloping or beveled wall 22. Holes for the three bolts 16 are provided as indicated at 23 and each of the bolts is provided with a nut 24, two of which are shown in the drawing.

The sleeve 14 as shown is provided with a substantial gap between its ends 25 and 26 and is of generally cylindrical configuration with upper and lower external beveled faces 27 and 28, respectively, the lower beveled face 28 being complementary to the wall 22 of the cavity 12. The split ring 15 is provided with substantial gap between its two ends indicated at 30 and 31 and its lower faces 32 conforming to the uper face 27 of the ring 14 and the outer face indicated at 33 conforming and being complementary to the upper beveled wall 19 of the cavity.

The semiconductor or transistor 13 is of the type comprising a generally cylindrical body as indicated at 34 and a flanged type base of cylindrical configuration as indicated at 35, the base being of greater diameter than the body 34.

When it is desired to mount a semiconductor element in the mounting device illustrated, the semiconductor is placed in the cavity 12 with its base 35 resting against the shoulder 20 at the bottom of the cavity. The split sleeve 14 is then placed about the case of the semiconductor between the cavity walls and the case and the split ring 15 is placed over the sleeve in engagement with the sleeve and the wall of the cavity. The screws 16 are then tightened down to urge the split ring against the cavity wall and against the split sleeve thereby forcing the sleeve against the semiconductor case and the ring against the cavity wall. This forces the beveled faces into face engagement and provides a good heat conducting path between the semiconductor element and the body 10 through the sleeve 14 and the ring 15. The slight sliding or rubbing action of the engaging faces during clamping of the ring helps to secure good face engagement.

Figure 3:
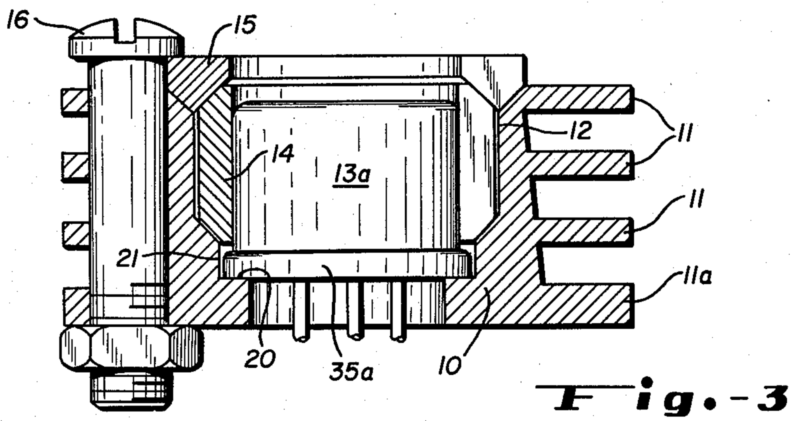
FIG. 3 is a sectional view taken generally along the line 3—3 of FIG. 1.

The action of the mounting device in clamping the semiconductor element differs depending upon the height of the base portion 35 of the element. These differences are illustrated in FIGS. 3 and 4, FIG. 3 showing the mounting of a transistor element 13, having a base flange *35a* shorter than the wall 21 of the cavity 12 and FIG. 4 illustrating a semiconductor element 13 having a base *35b* of greater height than the wall 21.

When the element *13a* is placed in cavity 12 and the sleeve 14 and ring 15 are positioned as illustrated, the screws 16 are tightened to exert downward pressure on the ring 15 and thus exert inward and downward pressure on the sleeve 14. This urges the sleeve against the walls of the element *13a* and also downwardly so that good thermal engagement is provided between the beveled wall 28 of the sleeve and the wall 22 of the cavity. Because the base *35a* is shorter than the wall 21, there is no engagement between the flat wall at the bottom of the sleeve 14 and the base, an annular space being left when the device is clamped in position. It will be noted, however, that there is a good heat conducting path from the sleeve through the beveled faces of the sleeve to the ring 15 and to the body 10 directly from the sleeve through the beveled wall 22 and from the sleeve through the ring to the beveled face 19 of the cavity 12. An annular space is left between the cylindrical outer wall of the sleeve 14 and the cylindrical wall 18 of the cavity 12. The radial width of this space depends on the relative dimensions of the element 13*a* and the cavity wall 18.

Figure 4:
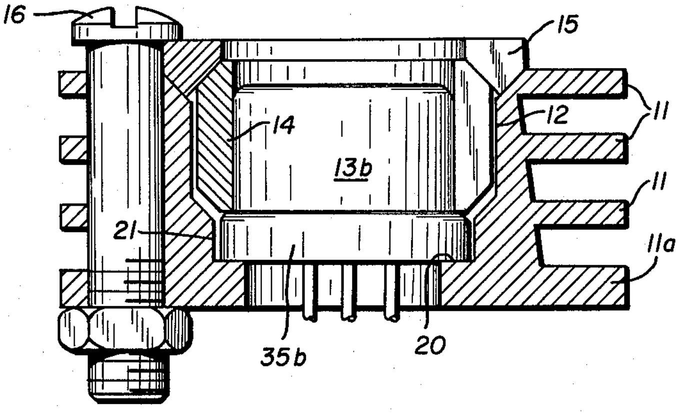
FIG. 4 is a sectional view similar to FIG. 3 showing a different semiconductor element mounted therein.

FIG. 4 illustrates a semiconductor device 13*b* placed on the mounting body 10 and having a base 35*b* higher than the wall portion 21 of the cavity 12. Consequently when the sleeve 14 is pressed into clamping position it engages the top horizontal face of the base 35*b* and the beveled face 28 and the sloping face 22 of the cavity 12 are spaced apart. In the course of mounting the element 13*b* the sleeve 14 is placed about the element and inserted with the element into the cavity 12; the ring 15 then rests against the upper beveled face of the sleeve 14 and against the upper sloping face 19 of the body 10 and is then forced downwardly by tightening the three screws 16. This clamping action presses the sleeve 14 downwardly against the base 35*b* and clamps the base securely between the sleeve and the wall or seat 20 and at the same time provides a heat conducting path from the sleeve 14 through the ring 15 to the body in the same manner as the mounting of FIG. 3.

It will thus be apparent that, regardless of the depth of the base of the element 13, the clamping action of the split sleeve 14 and split ring 15 acting with the configuration of the wall of the cavity 12 provides good heat conducting paths between the transistor or other semiconductor element and the mounting body 10. Thus the heat generated within the transistor or other semiconductor element is conducted to the body 10 and may be dissipated therefrom by radiation and by conduction to the gas, air or other fluid flowing over the fins 11. Furthermore, additional heat may be conducted away by clamping the base 11*a* securely against a heat conducting platform (not shown). The mounting provides full protection of the semiconductor element when clamped within the mounting cavity.

Figure 5:
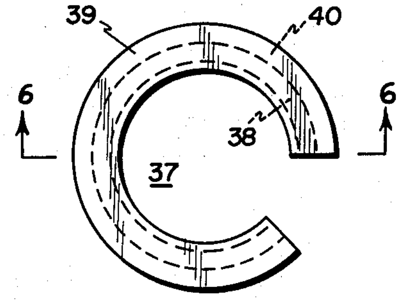
FIG. 5 is a plan view illustrating a modified form of a portion of the device of FIG. 1.
Figure 6:
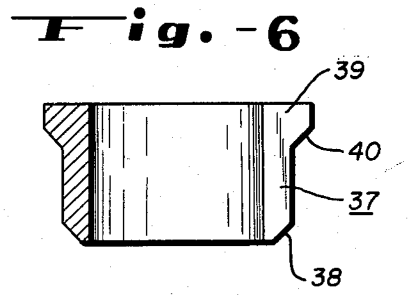
FIG. 6 is a sectional elevation view taken along the line 6—6 of FIG. 5.

In FIGS. 5 and 6 there is illustrated an embodiment of the invention in which the split sleeve and ring are made as an integral element. This integral element comprises a cylindrical body 37 having a lower outside beveled face 38 corresponding to the beveled face 28 of the sleeve 14 and an upper enlarged cylindrical portion or section 39 taking the place of the ring 15 of the first embodiment. The portion 39 is in the form of an outwardly extending flange about the upper edge of the ring 37 and is provided with an external, inwardly sloping, downwardly facing shoulder 40 which corresponds to the beveled face 33 of the ring 15. The beveled faces 38 and 40 are parallel and are spaced so that, when the ring 37 is placed, for example, in the body 10 of the first embodiment, the faces 38 and 40 will engage the beveled faces 22 and 19, respectively, and upon clamping of the ring 37 into the body 10 these faces will be pressed into good heat transfer relationship and the inner wall of the sleeve 37 will be pressed against the semiconductor element which it surrounds. In this embodiment of the invention the dimensions of the body 10 with which it is used are such that the vertical wall 21 is sufficiently high to accommodate the bases of all semiconductor elements to be mounted therein. Thus the beveled faces of the sleeve always engage the corresponding beveled faces of the body in the same manner as illustrated in FIG. 3 with respect to the sleeve and ring construction of the first embodiment.

It will now be apparent that, when the sleeve 37 is placed over an element such as the element 13, it will engage the element in the same manner as the sleeve 14 and, by clamping the screw 16 against the top of the portion 39, the element 37 will be forced into good heat conducting relationship with a semiconductor element such as the element 13 and will provide good heat conducting paths between the element through the faces 38 and 40 as illustrated in FIG. 3 with respect to the sleeve and ring construction of the first embodiment.

It will thus be seen that both embodiments of the invention provide a secure rigid mounting for semiconductor components and also provide a good heat conducting path to the heat dissipating body 10 so that heat may readily be removed from the semiconductor device to air circulated over the fins of the body. A simple and effective arrangement for mounting transistors and other semiconductors has thus been provided as well as a device which affords good dissipation of heat generated in the semiconductor element.

While the invention has been illustrated and described in connection with specific structural embodiments, various other modifications and applications will occur to those skilled in the art. Therefore, it is not desired that the invention be limited to the specific construction illustrated and described and it is intended by the appended claims to cover all modifications which fall within the spirit and scope of the invention.

I claim:

1. A combined mounting and heat dissipating device for semiconductor components and the like comprising a body of material of high thermal conductivity having a cavity therein of sufficient size for receiving a component to be mounted in spaced relationship to the walls of the cavity, said body having an external heat dissipating surface thereon, means arranged in said cavity for securing a component therein in heat exchange relationship with the walls of said cavity, said means including a split shell of high conductivity material arranged to be positioned between the walls of said cavity and the external wall of a component to be mounted, and clamping means for forcing said shell into good heat transfer relationship with both said body and a component mounted in said cavity whereby such component may be securely mounted in said body and heat generated by such component may be dissipated at said surface of said body, said device further including a split wedging element constructed and arranged to engage said split shell and to cooperate with said clamping means to force said shell downwardly into the cavity and inwardly against a omponent in the cavity, said wedging element being made of good thermal conductivity material and providing a heat path between said shell and said body.

2. A combined mounting and heat dissipating device for semiconductor components and the like comprising a body of material of high thermal conductivity having a cavity therein of sufficient size for receiving a component to be mounted in spaced relationship to the walls of the cavity, said body having an external heat dissipating surface thereon, means arranged in said cavity for securing a component therein in heat exchange relationship with the walls of said cavity, said means including a split shell of high conductivity material arranged to be positioned between the walls of said cavity and the external wall of a component to be mounted, and clamping means for forcing said shell into good heat transfer relationship with both said body and a component mounted in said cavity whereby such component may be securely mounted in said body and heat generated by such component may be dissipated at said surface of said body, wherein said body and said shell being formed to provide oppositely sloping surfaces near the top of said body and said securing means including a split ring member having surfaces engaging both said sloping surfaces, and said clamping means being arranged to force said member against said sloping surfaces to urge said shell against a component in the cavity and said member into good heat transfer relationship with said body and said shell.

3. A combined mounting and heat dissipating device for semiconductor components and the like comprising a body of material of high thermal conductivity having a cavity therein of sufficient size for receiving a component to be mounted in spaced relationship to the walls of the cavity, said body having an external heat dissipating surface thereon, means arranged in said cavity for securing a component therein in heat exchange relationship with the walls of said cavity, said means including a split shell of high conductivity material arranged to be positioned between the walls of said cavity and the external wall of a component to be mounted, and clamping means for forcing said shell into good heat transfer relationship with both said body and a component mounted in said cavity whereby such component may be securely mounted in said body and heat generated by such component may be dissipated at said surface of said body, the walls of said cavity being cylindrical and said split sleeve comprising a cylindrical collar, said securing means including a split ring, said collar and ring and body having beveled surfaces engaging one another and said clamping means being arranged to force said ring into good heat transfer engagement with said body and said collar and to force said collar into good heat exchange relationship with a component in the cavity and to hold such component rigidly in position while affording a good heat transfer path between the component and such body.

4. A combined mounting and heat dissipating device for semiconductor components and the like comprising a body of material of high thermal conductivity having a cavity therein of sufficient size for receiving a component to be mounted in spaced relationship to the walls of the cavity, means for facilitating dissipation of heat from said body, means arranged in said cavity for securing a component therein in heat exchange relationship with the walls of said cavity, said last mentioned means including a split shell of high conductivity material arranged to be positioned between the walls of said cavity and the external wall of a component to be mounted, the internal wall of said cavity being formed to provide two concentric parallel beveled faces sloping inwardly away from the entrance end of the cavity and spaced axially along the cavity, the outer edge of the beveled face farther from said entrance end being substantially in axial alignment with the inner edge of the other face and said split shell having formed thereon two parallel beveled faces formed and positioned to engage and conform to respective ones of the beveled faces of said body, and clamping means for urging said shell into said cavity with said beveled faces in engagement whereby said shell may be forced against a component therein and said beveled faces thereby pressed into good heat transfer relationship for conducting heat generated by such component to said surface of said body.

5. A combined mounting and heat dissipating device for semiconductor components and the like comprising a body of material of high thermal conductivity having a cavity therein for receiving a component to be mounted in spaced relationship to the walls of the cabinet, means for failitating the dissipation of heat from said body, means arranged in said cavity for securing a component therein in heat exhange relationship with the walls of the cabinet, said last mentioned means including a split shell of high conductivity material arranged to be positioned between the walls of said cavity and the external wall of a component, the internal wall of said cavity being formed to provide a shoulder adjacent the lower end thereof and two concentric parallel beveled faces above the shoulder, said beveled faces sloping inwardly away from the entrance end of the cavity and being spaced from one another axially along the cavity, the outer edge of the beveled face farther from said entrance end being substantially in axial alignment with the inner edge of the other beveled face, said split shell having formed thereon two parallel beveled faces formed and positioned to engage and conform to respective ones of the beveled faces of said body, and clamping means for urging said shell into said cavity with said beveled faces in engagement whereby said shell may be forced against a component therein and said beveled faces thereby pressed into good heat transfer relationship for conducting heat to said body and whereby a component within said shell may be pressed against said shoulder in good heat transfer relationship.

6. A combined mounting and heat dissipating device for semiconductor components and the like comprising a body of material of high thermal conductivity having a cavity therein for receiving a component to be mounted in spaced relationship to the walls of the cavity, means for facilitating the dissipation of heat from said body, means for securing a component in said cavity in heat exchange relationship with the walls thereof, said last mentioned means including a split shell of high conductivity material arranged to be positioned between the wall of said cavity and the external wall of a component therein, the wall of the cavity being formed to provide two parallel shoulders sloping inwardly away from the entrance end of the cavity and spaced axially along the cavity, the outer edge of the shoulder farther from said entrance end being substantially in axial alignment with the inner edge of the other shoulder, said shell having two sloping shoulders formed and positioned to engage and conform to respective ones of said shoulders on the cavity wall, and clamping means for urging said shoulders on said shell against said wall shoulders and for compressing said shell and forcing said shell into good heat transfer relationship with both said body and a component mounted in said cavity whereby a component may be securely mounted in said body and heat generated by such component may be transferred to said body and be dissipated.

References Cited in the file of this patent

UNITED STATES PATENTS

| | | |
|---|---|---|
| 2,879,977 | Trought | Mar. 31, 1959 |
| 3,033,537 | Brown | May 8, 1962 |